(12) United States Patent
Ellement

(10) Patent No.: US 9,789,803 B2
(45) Date of Patent: Oct. 17, 2017

(54) RETRIEVAL TRAILER

(71) Applicant: Barjoh Pty Ltd, Oakford (AU)

(72) Inventor: Nathan John Ellement, Oakford (AU)

(73) Assignee: Barjoh Pty Ltd, Oakford (AU)

( * ) Notice: Subject to any disclaimer, the term of this patent is extended or adjusted under 35 U.S.C. 154(b) by 218 days.

(21) Appl. No.: 14/735,139

(22) Filed: Jun. 10, 2015

(65) Prior Publication Data
US 2016/0362037 A1    Dec. 15, 2016

(51) Int. Cl.
*B60P 3/07*    (2006.01)
*B60P 3/12*    (2006.01)

(52) U.S. Cl.
CPC ............... *B60P 3/07* (2013.01); *B60P 3/125* (2013.01)

(58) Field of Classification Search
CPC .. B60P 3/12; B60P 3/122; B60P 3/125; B60P 3/127; B60P 3/07; B60P 1/48; B60P 1/483; B60P 1/54; B60P 1/5423; B60P 1/5428; B60P 1/5433
See application file for complete search history.

(56) References Cited

U.S. PATENT DOCUMENTS

| | | | | |
|---|---|---|---|---|
| 2,471,521 A | * | 5/1949 | Galey | B60P 3/07 280/401 |
| 3,522,892 A | * | 8/1970 | Vegors | B60P 3/127 280/402 |
| 3,825,132 A | * | 7/1974 | Colangelo | B66C 23/48 254/326 |
| 3,827,586 A | * | 8/1974 | Lambert, Sr. | B60P 3/127 254/264 |
| 3,841,506 A | * | 10/1974 | Smith | B60P 3/127 280/402 |
| 4,743,158 A | * | 5/1988 | Hodges | B60P 3/127 280/402 |
| 4,991,862 A | * | 2/1991 | Tsao | B64F 1/224 180/904 |
| 2014/0210182 A1 | * | 7/2014 | Knight | B60D 1/665 280/404 |

* cited by examiner

*Primary Examiner* — Glenn Myers
(74) *Attorney, Agent, or Firm* — Charles H Jew

(57) ABSTRACT

A vehicle retrieval trailer for use in towing a failed vehicle. The trailer has a chassis supporting a towbar with first attachment means to releasably attach the trailer to a tow vehicle and a second attachment means to releasably attach the trailer to a vehicle to be towed, and ground engaging means supporting the support structure, and a hitch separate from the first attachment means for attaching the trailer to a transport vehicle. The retrieval trailer can include an on-board air compressor and an on-board hydraulic power pack. The retrieval trailer can be used for rescuing failed or dead vehicles, particularly mining vehicles.

29 Claims, 1 Drawing Sheet

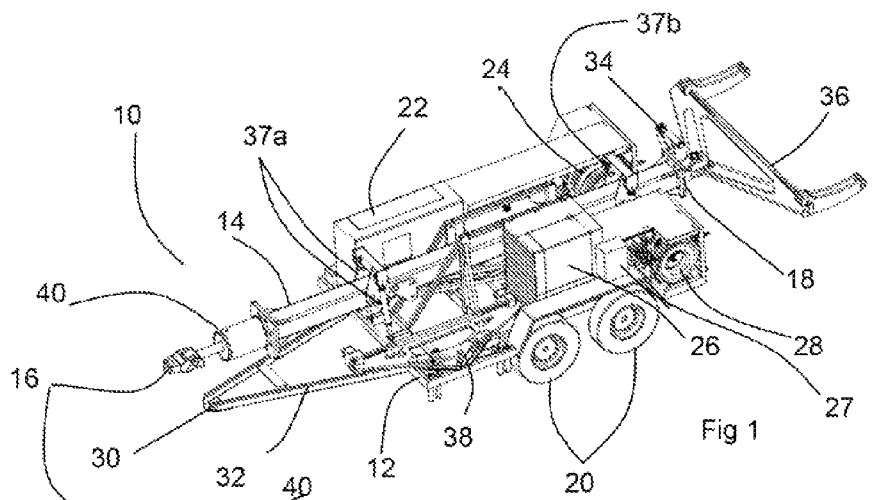
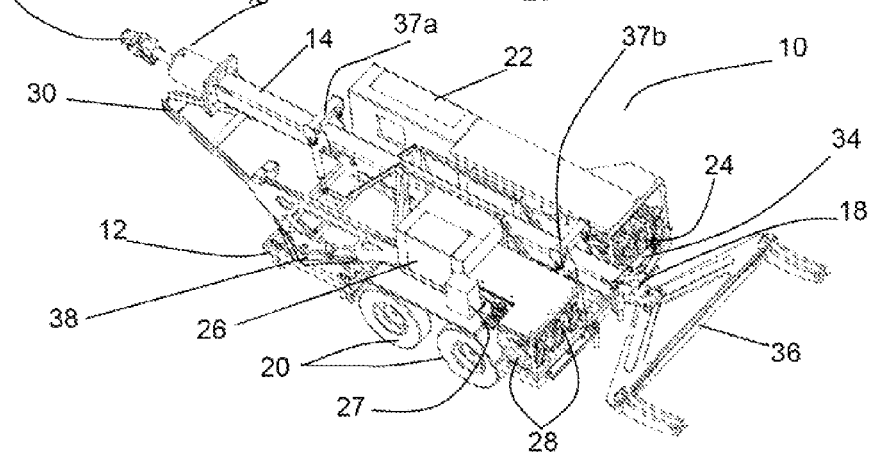
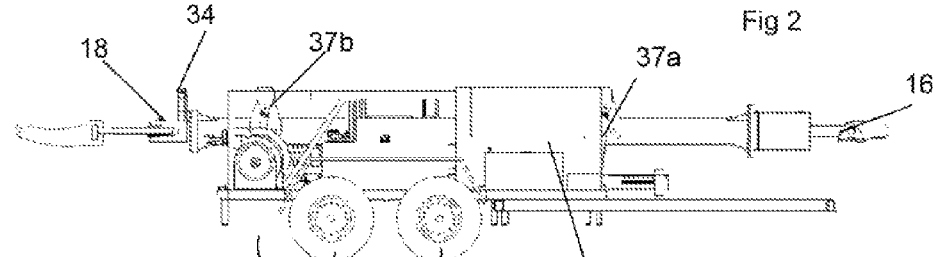
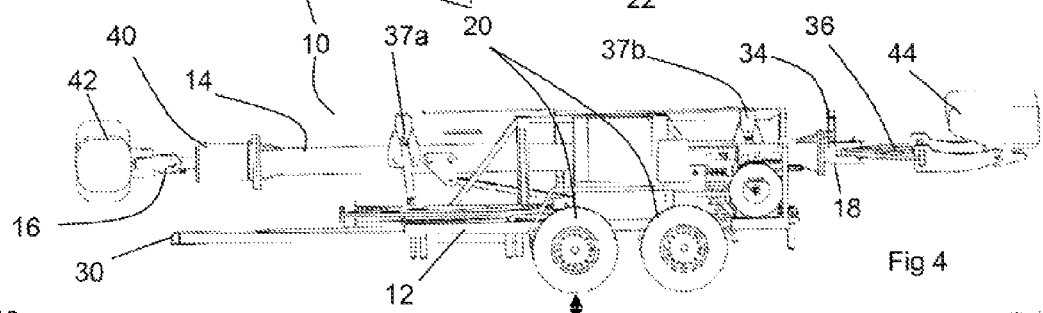

RETRIEVAL TRAILER

FIELD OF THE INVENTION

The present invention relates to a trailer provided for use in recovering failed/disabled industrial/commercial vehicles.

The present invention particularly relates to a mobile retrieval trailer incorporating a towbar facility for recovering incapacitated mining vehicles or the like.

BACKGROUND TO THE INVENTION

Vehicles used in the mining, other resources and other heavy duty industries, such as construction, typically far exceed the tare or gross vehicle mass of normal road going equivalents.

Such vehicles (e.g. rigid haul trucks (aka haul packs), articulated haul trucks, front end loaders, water carts, service vehicles, large cranes etc.) cannot be safely towed by ordinary (light duty) rescue vehicles such as standard 4-wheel drive vehicles because such towing vehicles do not have the very high towing capacity required to safely tow large mining vehicles.

Also, such large industrial and mining vehicles typically have pneumatic, hydraulic and electrical operating systems, e.g. air operated brakes, hydraulic drive and steering systems, that require a respective pneumatic, hydraulic or electrical supply before a 'dead' vehicle can be towed safely. For example, a pneumatic or hydraulic supply may be needed to release brakes on a large vehicle before towing.

Towbars for large industrial/mining vehicles are known. Typically such towbars consist of a long metal shaft of several meters length with connectors at each end to attach the towbar between the tow and towed vehicles.

Some towbars used by tugs/tractors to tow commercial aircraft have wheels to help support the shaft. However, such towbars can remain in the immediate vicinity of where they will be used, ready and waiting for the next aircraft to tow from or pushback to an airport gate or hangar. It is known exactly where they will be needed, and will be used regularly at the same places.

For mining and other commercial/industrial applications, it is not safe or practical to have towbars waiting around for their next use. The next vehicle breakdown could happen anywhere on a site or within an underground mine.

It would be beneficial to have a trailer that can be conveniently towed as and when required by a light duty vehicle to the failed vehicle, and then, incorporating a towing means, be connected between the failed vehicle to be towed and a tow vehicle to retrieve the failed vehicle.

Such a retrieval trailer is mobile and rapidly moveable from site to site to be used to rescue failed heavy industrial vehicles, thereby alleviating delay in waiting on a specialised towbar to be delivered or the potentially dangerous use of steel towing cables between vehicles. Steel cables can snap causing bodily injury, and because of their flexibility do not provide a rigid link between the towing and towed vehicles for the required control of the towed vehicle and safety during towing.

SUMMARY OF THE INVENTION

With the aforementioned in mind, in one aspect the present invention provides a vehicle retrieval trailer for use in towing a failed vehicle, the trailer having a support structure supporting a towbar with first attachment means to releasably attach the trailer to a tow vehicle and a second attachment means to releasably attach the trailer to a vehicle to be towed, and ground engaging means supporting the support structure, and a hitch separate from the first attachment means for attaching the trailer to a transport vehicle.

The trailer preferably includes towbar position adjustment means to vary the vertical and/or horizontal position of towbar e.g. relative to the tow connection point(s) on the vehicles to tow and be towed.

Thus, whilst the trailer is positioned with its ground engaging means on the ground, the height and/or lateral position of one or both of the towbar first and second attachment means can be position controlled to attach to the vehicle(s).

The towbar may be longitudinally extendible, such as by a hydraulic ram extending and/or retracting the first or second attachment means relative to the support structure.

The first and/or second attachment means may be rotatable relative to the support structure. For example, the first and/or second attachment means may be pivotably connected to the towbar and driven to rotate by one or more actuators, such as a hydraulic ram, electric motor or pneumatic actuator.

The retrieval trailer is configured to be towed by a light vehicle, such as a standard 4 wheel drive e.g. with a standard 70 mm tow ball coupling.

The retrieval trailer has a relatively low mass (of approximately 4 tonne) relative to the vehicles that it will be used to tow. This helps to ensure that the transport vehicle that brings the trailer to the required site for use has sufficient towing capacity to safely tow the trailer.

The transport vehicle supplies 12V electrical power for the brake controller during transport. The trailer may be equipped with an electrical brake-away brake circuit. In the event that the trailer should become unhitched from the transport vehicle, the 12V battery on the retrieval trailer will energise the electric trailer brakes and lock them on.

The retrieval trailer may carry at least one tow adapter. The at least one tow adapter may include an A-frame for use on the second end of the towbar to adapt or connect the second attachment means to multiple tow points on the vehicle to be towed or the vehicle towing. Thus, a single towable second attachment means can be adapted to a multiple attachment to suit the attachment points on the vehicle to be towed or towing. This beneficially adapts the trailer to connect between vehicles with single or multiple towing points, advantageously spreads the towing force through multiple points on the vehicle to be towed, and helps with towing control of the dead mass of the vehicle to be towed.

The at least one tow adapter may be supported for transport on the trailer support structure, such as in a cradle or other dedicated mountings.

The retrieval trailer may include an on-board power supply. The on-board power supply may provide one or more of hydraulic, pneumatic and electrical supply to the failed/disabled vehicle to be towed. The on-board power supply may be self contained as a power unit, including having a fuel supply and hydraulic/pneumatic reservoirs for supply of hydraulic and/or pneumatic pressure to the failed/disabled vehicle.

The retrieval trailer may include hydraulic and/or pneumatic hose reels for connection of respective hydraulic and/or pneumatic supply. The hoses are therefore connected to the on-board power supply.

Thus, the retrieval trailer is able to provide pneumatic and hydraulic power to the stricken machine via the trailer's on-board power supply, such that fundamental systems (e.g. steering and brakes) of the failed/disabled vehicle can be operated while being towed by another vehicle (the tow vehicle).

Preferably the retrieval trailer on-board power supply can be used to operate one or more of the failed/disabled vehicle's systems e.g. to enable the hoist cylinders of a dump truck to discharge a load that may be in the disabled vehicle's body before towing is commenced.

The retrieval trailer may include lift means to retract the ground engaging means of the trailer (preferably wheels). For example, when the first and second attachment means of the retrieval trailer are connected to the respective tow and towed vehicles, the lift means may be operated to raise the ground engaging means to be out of contact with the ground.

The lift means may be a dedicated lift system, such as one or more mechanical, hydraulic, electrical or pneumatic actuators acting between the ground engaging means/support structure and the towbar, or the lift means may be provided by the towbar height adjustment means.

For example, once the first and second attachment means have been height positioned and connected to their respective tow and towed vehicles, the height adjustment means can be retracted such that the wheels of the retrieval trailer lift of the ground and the support structure and ground engaging means are then suspended above the ground. The towbar physically connects the two vehicles for towing, and the on-board power supply of the trailer supplies necessary systems for brakes and steering on the failed/disabled vehicle to be towed.

The hitch may be connected to the support structure via an A-frame structure. The hitch may be provided by a towball hitch for hitching the retrieval trailer to a standard light duty vehicle for towing the retrieval trailer to the failed/disabled vehicle.

Thus, the retrieval trailer is conveniently and advantageously mobile by towing by a standard road vehicle, and can travel from site to site wherever there is a failed/disabled vehicle, and can do so within a reasonable reaction time at normal road speeds, thereby avoiding the need for a specialist/dedicated type of towbar at each site. This reduces the need for what is often not fully utilised equipment, but also reduces over cost and improves reaction times to help recover the failed/disabled vehicle, which reduces lost operating time.

The retrieval trailer is able to provide pneumatic and hydraulic power to the stricken machine via the trailer's on-board power supply. So fundamental systems such as steering and brakes of the broken down truck can be operated while being towed by another vehicle. The retrieval trailer can also be used to enable the hoist cylinders to discharge a load that may be in the disabled truck body before towing is commenced.

BRIEF DESCRIPTION OF THE DRAWINGS

One or more embodiments of the present invention will hereinafter be described with reference to the accompanying drawings, in which:

FIGS. 1 and 2 show respective front and rear perspectives of a retrieval trailer according to an embodiment of the present invention.

FIG. 3 shows a side view of the retrieval trailer of FIGS. 1 and 2.

FIG. 4 shows a side view of the retrieval trailer of FIGS. 1 to 3 connected to a tow vehicle and a failed/disabled vehicle, and with wheels raised ready for towing.

DESCRIPTION OF PREFERRED EMBODIMENT

FIGS. 1 to 4 show a retrieval trailer 10 of an embodiment of the present invention.

The trailer includes a chassis 12 (support structure) supporting a towbar 14.

The towbar includes a first attachment means 16 at a front end to connect the trailer to a tow vehicle, and a second attachment means 18 at a rear end to connect the trailer to the vehicle to be towed.

The chassis is supported on wheels 20 in contact with the ground.

The trailer 10 includes an on-board air compressor 22 supplying compressed air to air hoses on reels 24.

The trailer also includes an on-board hydraulic power pack 26 (including an engine driving a hydraulic pump) supplying hydraulic pressure to hydraulic hoses on hose reels 28.

The trailer also includes a tow hitch 30 connected by an A-frame 32 to the chassis. The tow hitch preferably receives a standard tow-ball, such as a 70 mm diameter tow-ball, for towing the trailer via a standard light duty vehicle, such as a 4 wd.

The second (rear) attachment means can be rotated relative to the towbar and vehicle to be towed. Rotation can be effected by an actuator 34, such as a ram acting between the towbar and the second attachment means. The second attachment means can therefore be connected to the towbar via a rotary pivot means.

Thus, the attachment means can be correctly orientated ready for connection to the vehicle to be towed. The second attachment means can include an adapter 36, such as a spreader bar or A-frame to provide multiple connection points to the failed/disabled vehicle.

Likewise, the first (front) attachment means be connected directly to a vehicle to do the towing, or can receive an adapter 38 to provide multi-point connection to the towing vehicle. The adapter 38 can be carried on the chassis as shown, as can the rear adapter 36.

The height of each respective end of the towbar can be adjusted to suit the vehicle to which the first or second attachment means is to be connected. Front height adjuster 37a and rear height adjuster 37b are provided between the chassis and the towbar. The front height adjuster includes a pair of linear actuators controlling upward and downward movement of the front end of the towbar, and a pair of linear actuators controlling upward and downward movement of the rear end of the towbar.

The first attachment means can be extendible relative to the towbar via a linear actuator 40, such as a hydraulic ram. This provides not only an advantage of improved versatility in positioning the towbar first attachment to the tow vehicle, but also allows the trailer overall length to be maintained as short as possible for transport and extended in length for towing duties/connection.

FIG. 4 shows the retrieval trailer 10 connected to a tow vehicle 42 and a failed/disabled vehicle 44 to be towed. The wheel lift means in this embodiment is provided by the pairs of linear actuators (hydraulic rams) of the height adjustment means 37a, 37b retracting such that the chassis and wheels are lifted clear of the ground 46 ready for towing to commence.

It will be appreciated that hydraulic and any other power connections to the towed vehicle are not shown in the drawings for the sake of clarity.

To demonstrate use of the retrieval trailer, a preferred procedure for securely attaching the retrieval trailer to a broken down/failed vehicle is outlined below:

The disabled vehicle is chocked or otherwise prevented from moving freely (rolling—e.g. due to an incline or rough ground). The failed vehicle has its starting system isolated to prevent accidental starting.

The rear A-frame is positioned close to the front of the failed/disabled vehicle (typically within 300 mm), ensuring the trailer is as square-on and central to the tow points on the failed/disabled vehicle as practicable. The ear retainers are removed from the rear A-frame by sliding the rear ears and aligning them with the tow points of the failed/disabled vehicle.

Spacing between the tow points on the disabled vehicle is measured and translated to the position of the rear ears, with equal spacing between the ears about the centre of the rear A-Frame being preferred.

The pivot lock pins are removed from the rear A-frame and safely stowed on the chassis.

The hydraulic suction hose reels are connected to the trailer manifolds and the hydraulic power pack engine (HPE) 26 started.

The towbar hydraulic controls 27 are operated to lower the rear of the towbar so the rear ears are below the bumper level of the disabled vehicle. The hydraulic controls are used to swivel the rear A-frame as required so it is parallel to the tow points on the disabled vehicle.

The towbar controls 27 are used to raise the rear of the towbar so the eyes of the rear ears and the tow points are aligned and slide the pins through. Pins are used that will fit through the towed machine's tow points and are secured with a large washer and lynch pin through the hole near the end of the respective pin.

The transport (light duty) vehicle is disconnected from the hitch at the front of the retrieval trailer.

Detaching from the Disabled Vehicle:

Chock the wheels of the broken down vehicle to prevent excessive movement. Check that the hydraulic hose reels are connected to the trailer manifolds. Start the HPE. Operate the towbar controls 27 to remove any external loads from the pins through the rear ears. Remove the lynch pin and washer from the end of the pins and remove the pins from the rear ears.

Attaching to the Tow Vehicle:

The tow point(s) of the tow vehicle determine(s) which configuration of attachment components will be used on the towbar—the yoke or the front A-frame.

Yoke Installation:

If the tow vehicle has a single tow point use the cardan joint on the towbar cylinder.

Manually rotate the towbar cylinder rod so the axis of the eye is horizontal. Slip the yoke support over the sides of the yoke so the pin holes are aligned and the rubber buffer is towards the bottom. Lift the cardan joint into place on the eye of the extension cylinder rod. Insert the large pivot pin through the yoke support side plates, the yoke and the cylinder eye. Lock the pin in place with the lynch pin.

Attaching to the Tow Vehicle:

Manually rotate the towbar cylinder rod so the axis of the eye is horizontal. Slip the yoke support over the sides of the yoke so the pin holes are aligned and the rubber buffer is towards the bottom. Insert the large pivot pin through the yoke support side plates, the yoke and the cylinder eye. Lock the pin in place with the lynch pin.

However, if the tow vehicle has dual tow points use the front A-frame on the Towbar Cylinder.

Manually rotate the towbar cylinder rod so the axis of the eye is vertical. When not in use the front A-frame is stowed on the front left corner of the trailer and retained by a clamp. Unclamp the front A-frame and use suitable lifting equipment to lift it into place about the eye of the towbar cylinder. There are four lifting eyes in the front A-Frame to lift it by. Insert the large pivot pin. Lock the pin in place with the lynch pin.

Attaching the retrieval trailer to the disabled vehicle correctly is critical to the safe recovery operation. The procedure for securely pinning the retrieval trailer to a broken down vehicle is outlined below:

Check that the hydraulic suction hose reels are connected to the trailer manifolds. Start the HPE. Operate the towbar hydraulic controls to fully retract the extension cylinder.

Use appropriate guiding techniques to guide the tow vehicle back so the tow vehicle's tow point(s) is just in front of the cardan joint or A-frame. If using the front A-Frame, remove the ear retainers, slide the front ears and align them with the tow points of the tow vehicle.

Measure the spacing of the tow points on the tow vehicle and translate this to the position of the front ears. Ensure they are as equally spaced about the centre of the front A-frame as practical.

Operate the towbar hydraulic controls to raise or lower the front of the towbar as required and then to extend the extension cylinder to be able to pin the retrieval trailer to the tow vehicle. The extension cylinder rate of travel has been deliberately designed to have a slow rate of travel as a safety measure to reduce the chance of personnel getting caught between moving components.

Use the large washer and lynch pin at the bottom of the tow pin to retain the pin. Raise the front support leg to the horizontal position.

Connecting the Retrieval Trailer to the disabled vehicle:

Correct connection of the retrieval trailer lines to the disabled vehicle is important to enable the operation of the essential systems required to safely tow the vehicle.

Ensure the retrieval trailer hydraulic lines are connected to either the manifolds on the trailer or to the disabled machine at all times. Make sure the hydraulic couplings on the retrieval trailer are compatible to those on the disabled vehicle. Keep the hydraulic connectors as clean as possible to prevent foreign matter entering the system.

Unloading the disabled/failed vehicle:

The retrieval trailer should be used to move an unladen vehicle with a fully lowered body only. If the broken down vehicle is loaded the retrieval trailer can be used to energise the lift cylinder circuit to raise the body and dump the load.

Connect the hydraulic/brake suction hose reel to the hydraulic oil port of the evacuation centre of the disabled truck. Connect the Hydraulic/Brake Pressure hose reel A to the head end port of the cylinder and hose reel B to the rod end of the hoist cylinder.

The hydraulic line control lever is placed in the centralised (non-detent) open centre position. When satisfied all the hoses are connected correctly, the HPE on the trailer can be started. Set the HPE to high idle. Move the control lever one position (non-detent) from the neutral position to supply pressurised oil to the hoist cylinders. The hoist cylinders will continue to extend while the lever is in the raise position. If the lever is returned to the neutral position the hoist cylinders should stay in their current position. To lower the body move the hydraulic line control lever in the opposite direction from the centralised position.

Once the body is fully lowered the HPE can be stopped and the lines to the hoist cylinder connected to the pressure manifold on the trailer and the hydraulic suction line removed from the service centre and connected back to the suction manifold. Note: pressure in the trailer Pressure lines drops off as soon as the HPE stops.

Connecting to the Steering Circuit: Make sure the HPE is not running. Connect the steering suction reel hose to the steering oil evacuation port in the service centre.

Connecting to the air system (air brake equipped vehicle): Connect the air pressure reel hose to the air tank charge line of the vehicle and open the tap on the vehicle line.

Connecting to the hydraulic system (hydraulic brake equipped vehicle): Connect the hydraulic/brake suction reel to the hydraulic port of the evacuation centre. Connect the hydraulic/brake pressure hose reel 'A' to the pressure line of the service brakes, prior to the system accumulator.

Disconnect the pressure reel B hose from the pressure manifold of the trailer. Raise the pressure reel control reel lever and lock it into its detent position.

Towing a disabled vehicle with the retrieval trailer: Once the retrieval trailer is attached to both vehicles and correctly connected to the broken down vehicle the vehicle towing operation can commence. The drivers of both vehicles should be able to clearly communicate with each other.

Ensure the transmission of the broken down vehicle is neutralised. Start, and if required, warm up the HPE at low idle. Start the air compressor if the broken down vehicle is equipped with air brakes. When the HPE has warmed up run it at high idle.

Operate the towbar hydraulic controls to move the towbar to the fully lowered position, which will have the effect of raising the retrieval trailer wheels off the ground and putting it into the towing position. If not already done so, stow the trailer support stand in the horizontal position.

Ensure the brakes of the tow vehicle are applied. Remove the wheel chocks from the broken down vehicle. Test the steering function of the broken down vehicle. Once the system pressure in the broken down vehicle is high enough to release the brakes, do so.

Slowly drive the tow vehicle forward and check the brakes of the broken down vehicle have released. Test the brakes of the broken down vehicle by gently applying its brakes to slow both vehicles.

Commence towing the broken down vehicle to the designated repair location. Note: the brake cooling circuit of the disabled vehicle will not be operational while being towed. The top speed of the vehicles while towing should preferably be limited to 5 km/h. However, the actual limit will be determined by local regulations, the tow and towed vehicles and the terrain etc.

The retrieval trailer is preferably rated to pull 110 tonne and compression rated to preferably 50 Tonne. In the event of a trailer system failure, the warning beacon will flash on trailer. Bring both vehicles to a stop as quickly as it is safe to do so and shut down the HPE.

Systems Operation:

Hydraulic System: The hydraulic circuit of the retrieval trailer can be classified into three parts; to connect to the steering circuit of the broken down vehicle, to connect to the hydraulic/brake circuit of the broken down vehicle and the components to control the position of the towbar.

When the retrieval trailer is not hydraulically connected to a broken down vehicle they should be connected to the appropriate manifolds. In this situation, oil from the hydraulic tank on the trailer is circulated through the trailer circuit.

When the trailer is hydraulically connected to a broken down vehicle the oil from the vehicle itself is circulated through the circuit. It is pressurised by the pumps on the trailer to power the circuits of the broken down machine.

Oil is drawn through the suction hose reels by gear pumps and passes through low pressure filters before feeding into variable displacement piston pumps. From the piston pumps oil passes through high pressure filter before passing into the pressure hose reels. Before the hydraulic/hoist pressure reels there is a directional control valve to control the oil flow through them to the broken down vehicle.

The Pressure Regulators are installed to limit the maximum circuit pressure. They scan be set to preferably 2500 psi. The Accumulators act as a dampener for controlling the stroke of the variable displacement piston pumps.

There is a solenoid operated dump valve for each variable displacement pump circuit. When the key for the HPE is turned to the 'Off' position the solenoids de-energise, allowing oil to return to tank. This immediately removes any pressure from the circuit.

The towbar positioning circuit is energised by the rear most gear pump. Oil is drawn from the trailer hydraulic tank, pressurised by the gear pump and passes through the towbar control valve block. The control block directs oil to either end of the Towbar positioning double acting cylinders, depending on the positioning of the valve spools. Each Towbar positioning function (extension, front and rear height and swivel) is controlled by its own control valve spool. Pressure for this circuit is controlled by a pressure regulator incorporated into the control valve block.

Electrical System: The retrieval trailer preferably runs a 12 volt negative earth electrical system. Activating the Emergency Stop cuts power to the fuel solenoids for the HPE and the air compressor engine. This stops fuel flowing to the engines causing them to stop.

The HPE low/high idle speed is operated by an electric solenoid acting via a linkage to the fuel pump. When the idle control switch is moved to the high idle position the solenoid is energised, pulling in the plunger and moving the fuel pump lever to the high idle position.

The trailer system alert beacon circuit is connected to the air compressor engine oil pressure switch, the HPE oil pressure switch, the HPE coolant temperature switch, and the hydraulic oil tank low level switch. All of these switches are of the normally open configuration. When any of these systems fall outside set parameters the corresponding switch contacts will close and activate both a warning indicator on the control panel and will also activate the system alert beacon. Due to the fitment of diodes in the system alert beacon circuit only the circuit that is causing the fault's warning indicator will activate on the control panel to aid in fault diagnosis. Power from the trailer system alert beacon comes from the battery circuit, through an inline fuse.

The amber safety beacon is wired connected to the trailer tail light circuit. The amber beacon will flash while the trailer is electrically connected to a light vehicle with its lights on. The work lights are connected to the battery circuit of the trailer, via an inline fuse, so do not require the HPE to be running to operate.

The claims defining the invention are as follows:

1. A vehicle retrieval trailer for use in towing a failed vehicle, the trailer having a support structure supporting a towbar with first attaching means to releasably attach the trailer to a tow vehicle and a second attaching means to releasably attach the trailer to a vehicle to be towed, and ground engaging means supporting the support structure, and a hitch separate from the first attaching means for attaching the trailer to a transport vehicle for transporting the vehicle retrieval trailer by towing to a site for the vehicle retrieval trailer to be used by the tow vehicle to tow the failed vehicle, and wherein the vehicle retrieval trailer further includes lift means to retract the ground engaging means of the vehicle retrieval trailer.

2. The trailer of claim 1, including towbar position adjusting means to vary the vertical and/or horizontal position of the towbar.

3. The trailer of claim 2, the towbar position adjusting means including towbar first attaching means and/or second attaching means for height and/or lateral position adjustment.

4. The trailer of claim 1, the towbar being longitudinally extendible by at least one actuator.

5. The trailer of claim 2, the towbar being longitudinally extendible by at least one actuator.

6. The trailer of claim 3, the towbar being longitudinally extendible by at least one actuator.

7. The trailer of claim 4, the at least one actuator including a hydraulic or pneumatic ram for extending and/or retracting the first or second attaching means relative to the support structure.

8. The trailer of claim 1, wherein the first and/or second attaching means is rotatable relative to the support structure or the towbar.

9. The trailer of claim 2, wherein the first and/or second attaching means is rotatable relative to the support structure or the towbar.

10. The trailer of claim 3, wherein the first and/or second attaching means is rotatable relative to the support structure or the towbar.

11. The trailer of claim 1, including an on-board power supply.

12. The trailer of claim 11, the on-board power supply providing one or more of hydraulic, pneumatic and electrical supply to the failed/disabled vehicle to be towed.

13. The trailer of claim 12, including on-board hydraulic and/or pneumatic hose reels for connection of respective hydraulic and/or pneumatic supply to respective systems of the vehicle to be towed.

14. The trailer of claim 1, wherein, when the first and second attaching means of the retrieval trailer are connected to the respective tow and towed vehicles, the lift means raises the ground engaging means out of contact with the ground such that the trailer is suspended by connection to the tow vehicle and the vehicle to be towed.

15. The trailer of claim 1, the lift means powered by an on-board power supply of the trailer.

16. The trailer of claim 14, the lift means powered by the on-board power supply of the trailer.

17. The trailer of claim 1, the lift means including one or more mechanical, hydraulic, electrical or pneumatic actuators acting between the ground engaging means or the support structure and the towbar.

18. The trailer of claim 14, the lift means including one or more mechanical, hydraulic, electrical or pneumatic actuators acting between the ground engaging means or the support structure and the towbar.

19. The trailer of claim 15, the lift means including one or more mechanical, hydraulic, electrical or pneumatic actuators acting between the ground engaging means or the support structure and the towbar.

20. A vehicle retrieval trailer for use in towing a failed/disabled vehicle, the trailer having a support structure supporting a towbar with first attaching means to releasably attach the trailer to a tow vehicle and a second attaching means to releasably attach the trailer to a vehicle to be towed, and ground engaging means supporting the support structure, and a hitch separate from the first attaching means for attaching the trailer to a transport vehicle for transporting the vehicle retrieval trailer by towing to a site for the vehicle retrieval trailer to be used by the tow vehicle to tow the failed vehicle, and wherein the vehicle retrieval trailer includes an on-board power supply providing one or more hydraulic, pneumatic and electrical supply to the failed/disabled vehicle to be towed, and one or more on-board hydraulic and/or pneumatic hoses for connection of respective hydraulic and/or pneumatic supply to respective systems of the vehicle to be towed.

21. The trailer of claim 20, including towbar position adjusting means to vary the vertical and/or horizontal position of the towbar.

22. The trailer of claim 21, the towbar position adjusting means including towbar first attaching means and/or second attaching means for height and/or lateral position adjustment.

23. The trailer of claim 20, the towbar being longitudinally extendible by at least one actuator.

24. The trailer of claim 21, the towbar being longitudinally extendible by at least one actuator.

25. The trailer of claim 22, the towbar being longitudinally extendible by at least one actuator.

26. The trailer of claim 23, the at least one actuator including a hydraulic or pneumatic ram for extending and/or retracting the first or second attaching means relative to the support structure.

27. The trailer of claim 20, wherein the first and/or second attaching means is rotatable relative to the support structure or the towbar.

28. The trailer of claim 21, wherein the first and/or second attaching means is rotatable relative to the support structure or the towbar.

29. The trailer of claim 22, wherein the first and/or second attaching means is rotatable relative to the support structure or the towbar.

* * * * *